US005241384A

United States Patent [19]

[11] Patent Number: 5,241,384

[45] Date of Patent: Aug. 31, 1993

Maetani

[54] DISPLAY APPARATUS

[75] Inventor: Susumu Maetani, Fukuoka, Japan

[73] Assignee: Matsushita Electric Industrial Co., Ltd., Osaka, Japan

[21] Appl. No.: 696,389

[22] Filed: May 6, 1991

[30] Foreign Application Priority Data

| | | | |
|---|---|---|---|
| May 24, 1990 | [JP] | Japan | 2-135030 |
| Jul. 25, 1990 | [JP] | Japan | 2-197311 |

[51] Int. Cl.[5] ..... H04N 3/10

[52] U.S. Cl. ..... 358/139; 358/148; 358/158

[58] Field of Search ..... 358/139, 148, 158, 159, 358/10, 51, 67–70; 315/364, 370, 367, 387, 398, 242

[56] References Cited

U.S. PATENT DOCUMENTS

| | | | |
|---|---|---|---|
| 4,159,484 | 6/1979 | Strathman | 358/10 |
| 4,467,359 | 8/1984 | Hosoya | 358/158 |
| 4,591,910 | 5/1986 | Lai et al. | 358/148 |
| 4,593,308 | 6/1986 | Kemplin | 358/10 |
| 4,739,403 | 4/1988 | Mark | 358/148 |
| 4,991,023 | 2/1991 | Nichols | 358/242 |
| 5,047,855 | 9/1991 | Correa | 358/148 |

*Primary Examiner*—James J. Groody
*Assistant Examiner*—David E. Harvey
*Attorney, Agent, or Firm*—Lowe, Price, LeBlanc & Becker

[57] ABSTRACT

A display apparatus includes a cathode ray tube. A deflection yoke is attached to the cathode ray tube. A deflection device serves to generate a sawtooth current in response to an input sync signal, and to feed the sawtooth current to the deflection yoke. A phase difference detector serves to detect a difference between a phase of the sawtooth current generated by the deflection means and a phase of a color pattern signal which represents a start and an end of luminance information in an input luminance signal. A correcting device serves to correct an image-indicated position in response to the phase difference detected by the phase difference detector.

9 Claims, 6 Drawing Sheets

DISPLAY APPARATUS

BACKGROUND OF THE INVENTION

This invention relates to a display apparatus usable in various systems such as a computer system or a word processor system.

Display apparatuses serve to convert a video signal into a corresponding image which is indicated on a screen. Some of display apparatuses are equipped with a circuit for adjusting the position of a reproduced image relative to a screen. As will be explained later, a prior art image-position adjusting circuit has some problem.

SUMMARY OF THE INVENTION

It is an object of this invention to provide an improved display apparatus.

A first aspect of this invention provides a display apparatus comprising a cathode ray tube; a deflection yoke attached to the cathode ray tube; a deflection means for generating a sawtooth current in response to an input sync signal, and feeding the sawtooth current to the deflection yoke; a phase difference detecting means for detecting a difference between a phase of the sawtooth current generated by the deflection means and a phase of a color pattern signal which represents a start and an end of luminance information in an input luminance signal; and correcting means for correcting an image-indicated position in response to the phase difference detected by the phase difference detecting means.

A second aspect of this invention provides a display apparatus comprising a cathode ray tube; a deflection yoke attached to the cathode ray tube; a deflection means for generating a sawtooth current in response to an input sync signal, and feeding the sawtooth current to the deflection yoke; a phase difference detecting means for detecting a difference between a phase of the sawtooth current generated by the deflection means and a phase of a color pattern signal which represents a start and an end of luminance information in an input luminance signal; and phase shifting means for shifting a phase of the input sync signal in response to the phase difference detected by the phase difference detecting means.

A third aspect of this invention provides a display apparatus comprising a cathode ray tube; a deflection yoke attached to the cathode ray tube; a deflection means for generating a sawtooth current in response to an input sync signal, and feeding the sawtooth current to the deflection yoke; a phase difference detecting means for detecting a difference between a phase of the sawtooth current generated by the deflection means and a phase of color pattern signal which represents a start and an end of luminance information in an input luminance signal; and current superimposing means for generating a direct current in response to the phase difference detected by the phase difference detecting means, and superimposing the generated direct current on the sawtooth current generated by the deflection means.

A fourth aspect of this invention provides a display apparatus comprising a cathode ray tube; a deflection yoke attached to the cathode ray tube; a deflection means for generating a sawtooth current in response to an input sync signal, and feeding the sawtooth current to the deflection yoke; a phase difference detecting means for detecting a difference between a phase of the sawtooth current generated by the deflection means and a phase of a color pattern signal which represents a start and an end of luminance information in an input luminance signal; phase shifting means for shifting a phase of the input sync signal in response to the phase difference detected by the phase difference detecting means; and current superimposing means for generating a direct current in response to the phase difference detected by the phase difference detecting means, and superimposing the generated direct current on the sawtooth current generated by the deflection means.

A fifth aspect of this invention provides a display apparatus comprising a screen; means for indicating an image on the screen in response to an input image information signal and an input sync signal; means for generating a reference signal having a predetermined phase relation with the input image information signal; means for detecting a difference between a phase of the input sync signal and a phase of the reference signal; and means for controlling a position of the indicated image relative to the screen in response to the detected phase difference.

A sixth aspect of this invention provides a display apparatus comprising a cathode ray tube; a deflection yoke attached to the cathode ray tube; a deflection means for generating a sawtooth current in response to an input sync signal, and feeding the sawtooth current to the deflection yoke; means for generating a color pattern signal representing a start and an end of luminance information in an input luminance signal; a variation width detecting means for detecting a width of a variation in the sawtooth current during an interval responsive to the color pattern signal; and means for controlling an amplitude of the sawtooth current in response to the detected variation width of the sawtooth current.

A seventh aspect of this invention provides a display apparatus comprising a screen; means for indicating an image on the screen in response to an input image information signal; means for detecting a dimension of the image indicated on the screen; means for generating a predetermined desired dimension of the image indicated on the screen; means for deriving a difference between the detected dimension and the desired dimension of the image; and means for controlling the dimension of the image in response to the derived difference.

DESCRIPTION OF THE PRIOR ART

Figure 1:
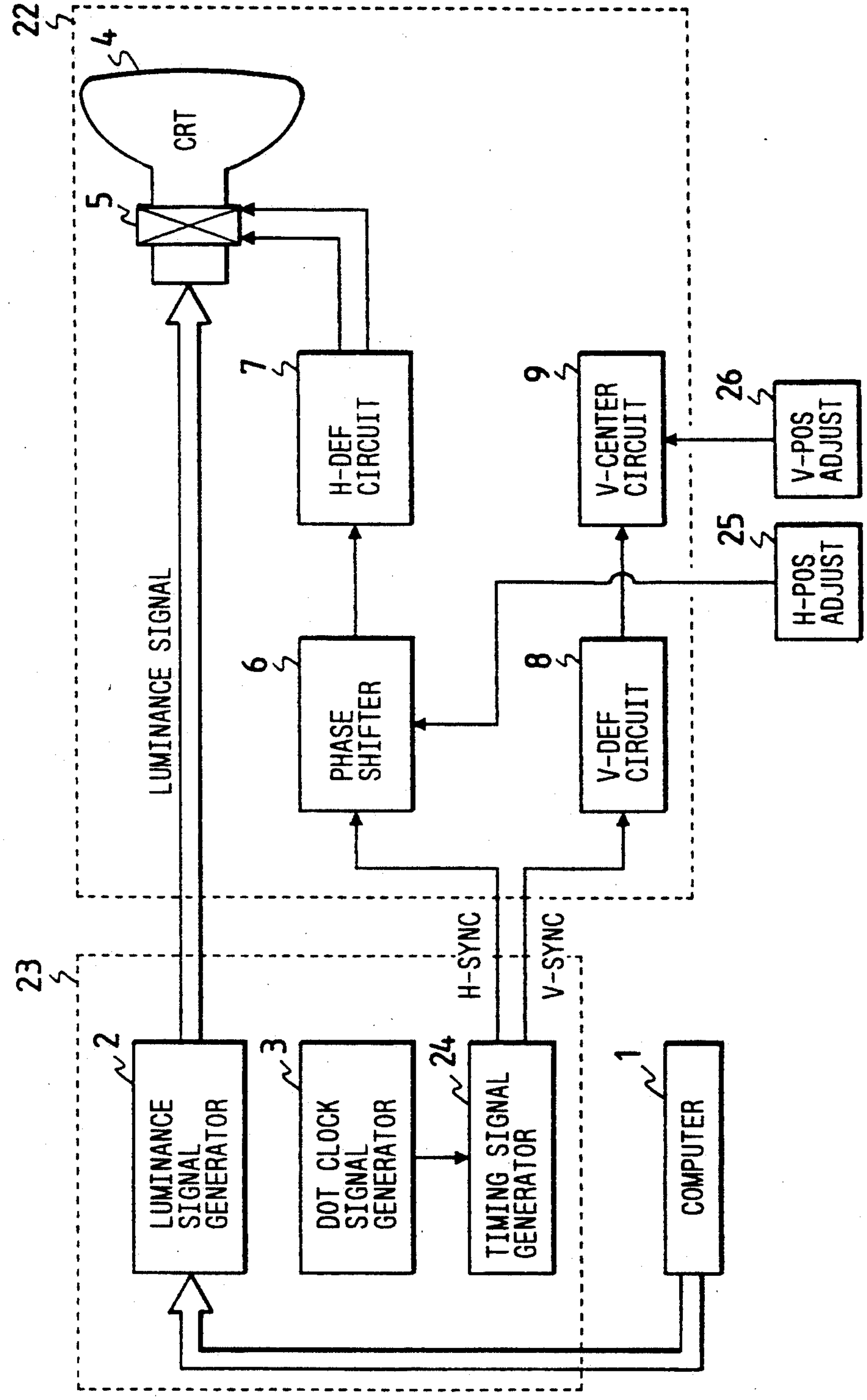
FIG. 1 PRIOR ART
FIG. 1 is a block diagram of a prior art display apparatus.

With reference to FIG. 1, a prior art display apparatus includes a display section (a main body) 22 and a video board 23. The display section 22 is connected to a computer 1 via the video board 23.

The video board 23 includes a luminance signal generator 2, a dot clock signal generator 3, and a timing signal generator 24. The luminance signal generator 2 receives display information (image information) from the computer 1, and generates a luminance signal corresponding to the received display information. The luminance signal generator 2 outputs the luminance signal to the display section 22. The dot clock signal generator 3 outputs a dot clock signal to the timing signal generator 24. The timing signal generator 24 functions to generate a vertical sync signal and a horizontal sync signal in response to the dot clock signal. The timing signal generator 24 outputs the vertical sync signal and the horizontal sync signal to the display section 22.

The display section 22 includes a cathode ray tube (CRT) 4, and a deflection yoke 5 associated with the CRT 4. The CRT 4 receives the luminance signal from the video board 23. The CRT 4 has a screen. The CRT 4 serves to indicate an image on the screen in response to the luminance signal.

The display section 22 also includes a phase shifter 6 and a horizontal deflection circuit 7. The horizontal sync signal outputted from the video board 23 is fed to the horizontal deflection circuit 7 via the phase shifter 6. The horizontal deflection circuit 7 generates a sawtooth current in response to the horizontal sync signal outputted from the phase shifter 6. The horizontal deflection circuit 7 feeds the sawtooth current to the deflection yoke 5. The phase shifter 6 receive a variable control voltage from a horizontal position adjustment section 25 including a variable resistor. The phase shifter 6 serves to shift the phase of the horizontal sync signal to adjust the horizontal position of the indicated image relative to the screen in response to the control voltage. As a control arm of the variable resistor within the horizontal position adjustment section 25 is moved, the indicated image is horizontally shifted relative to the screen of the CRT 4.

The display section 22 further includes a vertical deflection circuit 8 and a vertical centering circuit 9. The vertical deflection circuit 8 receives the vertical sync signal from the video board 23. The vertical deflection circuit 8 generates a sawtooth current in response to the vertical sync signal. The vertical centering circuit 9 receives the sawtooth current from the vertical deflection circuit 8. The vertical centering circuit 9 serves to modifies the received sawtooth current into a second sawtooth current. The vertical centering circuit 9 feeds the second sawtooth current to the deflection yoke 5. The vertical centering circuit 9 functions to adjust the vertical position of the indicated image relative to the screen. Specifically, the vertical centering circuit 9 receive a variable control voltage from a vertical horizontal position adjustment section 26 including a variable resistor. The vertical centering circuit 9 generates a dc current in response to the control voltage, and superimposes the dc current on the received sawtooth current and thereby converts the received sawtooth current into the second sawtooth current. As a control arm of the variable resistor within the vertical position adjustment section 26 is moved, the indicated image is vertically shifted relative to the screen of the CRT 4.

In this way, the output image information from the computer 1 is visualized on the screen of the CRT 4 by using the luminance signal, the horizontal sync signal, and the vertical sync signal. The position of the reproduced image on the screen is determined by the relation between the phase of the luminance signal and the phases of the horizontal sync signal and the vertical sync signal.

When the indicated image is required to be horizontally centered at the screen of the CRT 4, the variable resistor within the horizontal position adjustment section 25 is actuated. As the variable resistor is actuated, the indicated image is horizontally shifted relative to the screen. When the indicated image is horizontally centered at the screen, the actuation of the variable resistor is stopped.

When the indicated image is required to be vertically centered at the screen of the CRT 4, the variable resistor within the vertical position adjustment section 26 is actuated. As the variable resistor is actuated, the indicated image is vertically shifted relative to the screen. When the indicated image is vertically centered at the screen, the actuation of the variable resistor is stopped.

In general, the relation between the phase of a luminance signal and the phases of a horizontal sync signal and a vertical sync signal varies from video board to video board. Thus, in the prior art display apparatus of FIG. 1, when the video board 23 is replaced by a new one, the relation between the phase of the luminance signal and the phases of the horizontal sync signal and the vertical sync signal tends to vary so that the indicated image tends to go off-center with respect to the screen. In such a case, it is necessary to re-adjust the position of the indicated image by actuating the variable resistors within the horizontal position adjustment section 25 and the vertical position adjustment section 26.

In general, the video board 23 has a circuit for changing the vertical scanning frequency determined by the vertical sync signal. When the vertical scanning frequency is changed, the relation between the phase of the luminance signal and the phases of the horizontal sync signal and the vertical sync signal tends to vary so that the indicated image tends to go off-center with respect to the screen. In such a case, it is necessary to re-adjust the position of the indicated image by actuating the variable resistors within the horizontal position adjustment section 25 and the vertical position adjustment section 26.

DESCRIPTION OF THE FIRST PREFERRED EMBODIMENT

Figure 2:
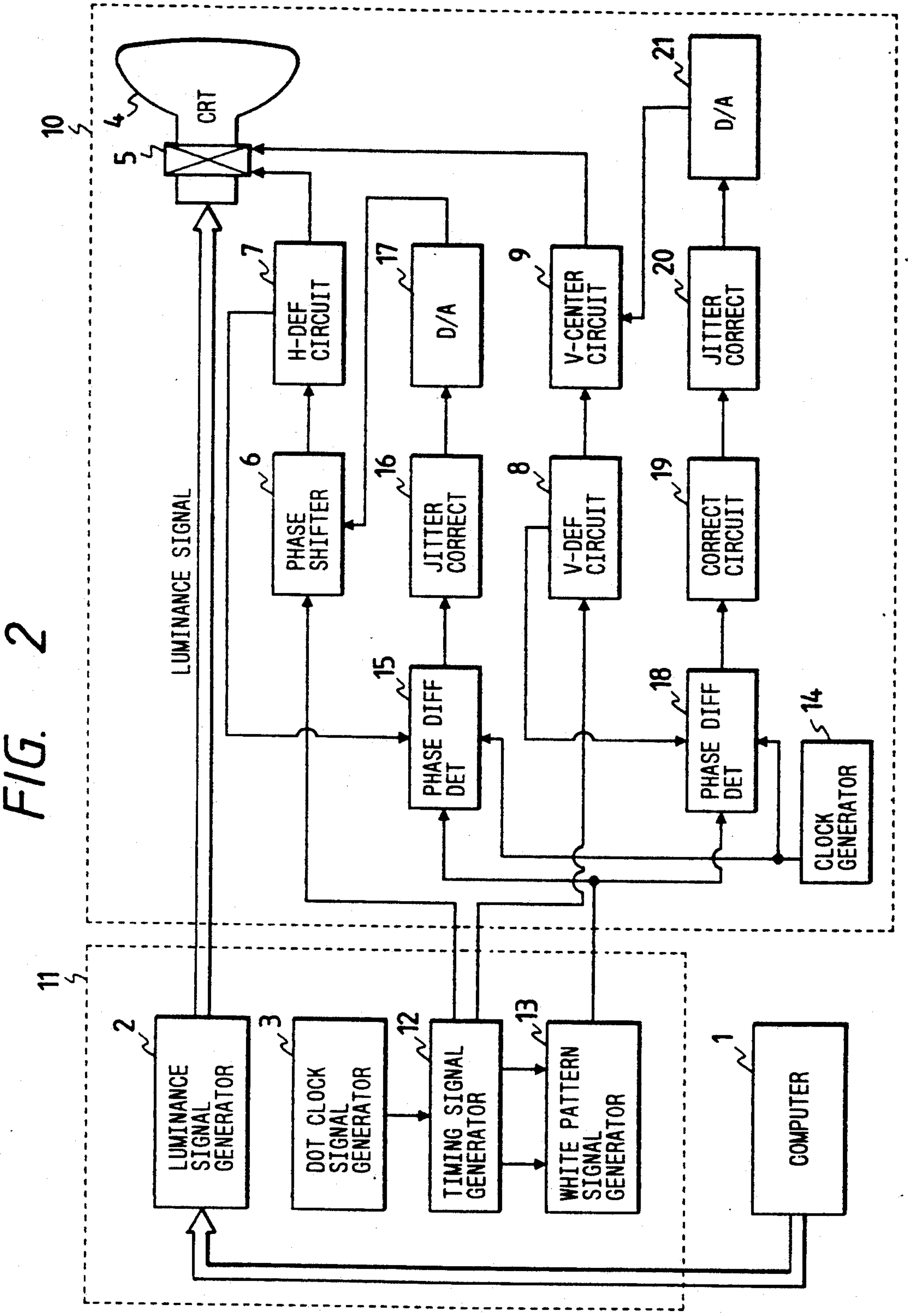
FIG. 2 is a block diagram of a display apparatus according to a first embodiment of this invention.

With reference to FIG. 2, a display apparatus of a first embodiment of this invention includes a display section (a main body) 10 and a video board 11. The display section 10 is connected to a computer 1 via the video board 11.

The video board 11 includes a luminance signal generator 2, a dot clock signal generator 3, a timing signal generator 12, and a white pattern signal generator 13. The luminance signal generator 2 receives display information (image information) from the computer 1, and generates a luminance signal corresponding to the received display information. The luminance signal generator 2 outputs the luminance signal to the display section 10. The dot clock signal generator 3 outputs a dot clock signal to the timing signal generator 12. The timing signal generator 12 has first and second portions. The first portion of the timing signal generator 12 functions to generate a vertical sync signal and a horizontal sync signal in response to the dot clock signal. The first portion of the timing signal generator 12 outputs the vertical sync signal and the horizontal sync signal to the display section 10. The second portion of the timing signal generator 12 functions to generate a front porch signal and a back porch signal in response to the dot clock signal. The second portion of the timing signal generator 12 outputs the front porch signal and the back porch signal to the white pattern signal generator 13. The white pattern signal generator 13 functions to generate a white pattern signal in response to the front porch signal and the back porch signal. The white pattern signal agrees with a luminance signal in which luminance information is continuously equal to white information. The white pattern signal generator 13 outputs the white pattern signal to the display section 10.

The display section 10 includes a cathode ray tube (CRT) 4, and a deflection yoke 5 associated with the CRT 4. The CRT 4 receives the luminance signal from the video board 11. The CRT 4 has a screen. The CRT 4 serves to indicate an image on the screen in response to the luminance signal.

The display section 10 also includes a phase shifter 6, a horizontal deflection circuit 7, a clock signal generator 14, a phase difference detector 15, a jitter correcting circuit 16, and a digital-to-analog (D/A) converter 17. The horizontal sync signal outputted from the video board 11 is fed to the horizontal deflection circuit 7 via the phase shifter 6. The horizontal deflection circuit 7 generates a sawtooth current in response to the horizontal sync signal outputted from the phase shifter 6. The horizontal deflection circuit 7 feeds the sawtooth current to the deflection yoke 5. The phase shifter 6 receive a variable control voltage from the D/A converter 17. The phase shifter 6 serves to shift the phase of the horizontal sync signal to adjust the horizontal position of the indicated image relative to the screen in response to the control voltage. As the control voltage varies, the indicated image is horizontally shifted relative to the screen of the CRT 4. The feed of the sawtooth current from the horizontal deflection circuit 7 to the deflection yoke 5 causes a flyback pulse signal, which is transmitted to the phase difference detector 15. The phase difference detector 15 receives the white pattern signal from the video board 11. The phase difference detector 15 also receives a clock signal from the clock signal generator 14. The phase difference detector 15 includes a counter which counts pulses of the clock signal during an interval corresponding to the difference between the phases of the flyback pulse signal and the white pattern signal. Thus, the counter within the phase difference detector 15 generates a count signal representing the phase difference between the flyback pulse signal and the white pattern signal. The count signal is fed from the phase difference detector 15 to the D/A converter 17 via the jitter correcting circuit 16. The jitter correcting circuit 16 removes jitter components from the count signal. The jitter-free count signal outputted from the jitter correcting circuit 16 is converted by the D/A converter 17 into a corresponding control voltage. In this way, the D/A converter 17 generates the control voltage which depends on the phase difference between the flyback pulse signal and the white pattern signal. As described previously, the control voltage is fed from the D/A converter 17 to the phase shifter 6. Thus, the horizontal position of the indicated image is controlled in response to the phase difference between the flyback pulse signal and the white pattern signal.

The display section 10 further includes a vertical deflection circuit 8, a vertical centering circuit 9, a phase difference detector 18, a count signal correcting circuit 19, a jitter correcting circuit 20, and a D/A converter 21. The vertical deflection circuit 8 receives the vertical sync signal from the video board 11. The vertical deflection circuit 8 generates a sawtooth current in response to the vertical sync signal. The vertical centering circuit 9 receives the sawtooth current from the vertical deflection circuit 8. The vertical centering circuit 9 serves to modify the received sawtooth current into a second sawtooth current. The vertical centering circuit 9 feeds the second sawtooth current to the deflection yoke 5. The vertical centering circuit 9 functions to adjust the vertical position of the indicated image relative to the screen. Specifically, the vertical centering circuit 9 receive a variable control voltage from the D/A converter 21. The vertical centering circuit 9 generates a dc current in response to the control voltage, and superimposes the dc current on the received sawtooth current and thereby converts the received sawtooth current into the second sawtooth current. As the control voltage varies, the indicated image is vertically shifted relative to the screen of the CRT 4. The feed of the sawtooth current from the vertical deflection circuit 8 to the deflection yoke 5 causes a vertical output pulse signal, which is transmitted to the phase difference detector 18. The phase difference detector 18 receives the white pattern signal from the video board 11. The phase difference detector 18 also receives the clock signal from the clock signal generator 14. The phase difference detector 18 includes a counter which counts pulses of the clock signal during an interval corresponding to the difference between the phases of the vertical output pulse signal and the white pattern signal. Thus, the counter within the phase difference detector 18 generates a count signal representing the phase difference between the vertical output pulse signal and the white pattern signal. The count signal is fed from the phase difference detector 18 to the count signal correcting circuit 19. Information of the vertical scanning frequency is also fed from the phase difference detector 18 to the count signal correcting circuit 19. The count signal correcting circuit 19 corrects the received count signal into a second count signal in response to the vertical scanning frequency. The second count signal is fed from the count signal correcting circuit 19 to the D/A converter 21 via the jitter correcting circuit 20. The jitter correcting circuit 20 removes jitter components from the second count signal. The jitter-free count signal outputted from the jitter correcting circuit 20 is converted by the D/A converter 21 into a corresponding control voltage. In this way, the D/A converter 21 generates the control voltage which depends on the phase difference between the vertical output pulse signal and the white pattern signal, and which also depends on the vertical scanning frequency. As described previously, the control voltage is fed from the D/A converter 21 to the vertical centering circuit 9. Thus, the vertical position of the indicated image is controlled in response to the phase difference between the vertical output pulse signal and the white pattern signal, and also in response to the vertical scanning frequency.

This embodiment will be further explained. As described previously, the timing signal generator 12 within the video board 11 generates the horizontal sync signal, the vertical sync signal, the front porch signal, and the back porch signal in response to the dot clock signal fed from the dot clock signal generator 3. The horizontal sync signal, the vertical sync signal, the back porch signal, and the front porch signal have waveforms such as shown in the parts (b), (c), (d), and (e) of FIG. 3. The white pattern signal generator 13 generates the white pattern signal in response to the front porch signal and the back porch signal. As shown in the part (f) of FIG. 3, the white pattern signal agrees with a luminance signal in which luminance information present for an interval determined by the front and back porch signals is made equal to white information. The white pattern signal generator 13 outputs the white pattern signal to the display section 10.

Figure 3:
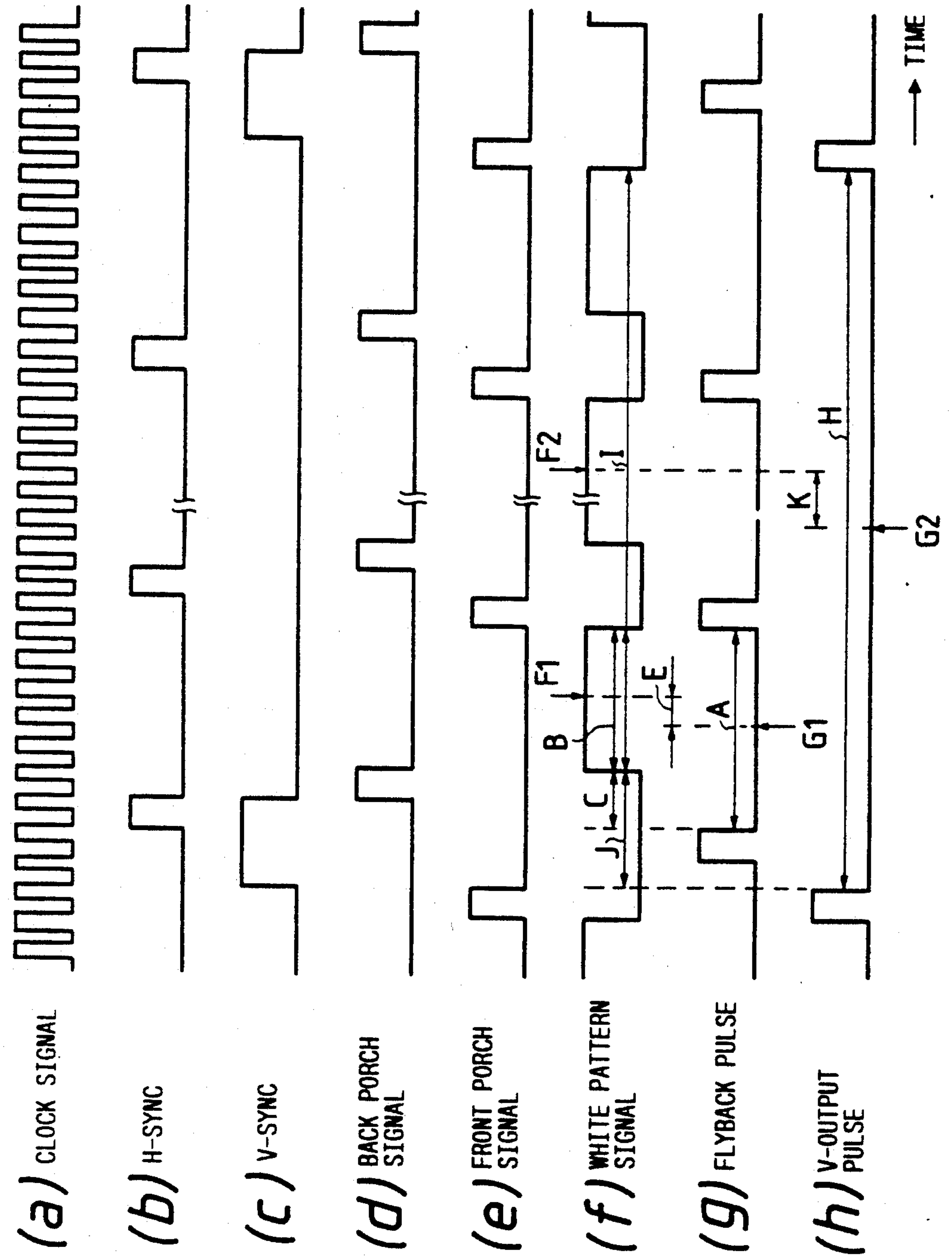
FIGS. 3(*a*)-(*h*) is a time-domain diagram showing the waveforms of various signals in the display apparatus of FIG. 2.
Figure 4:
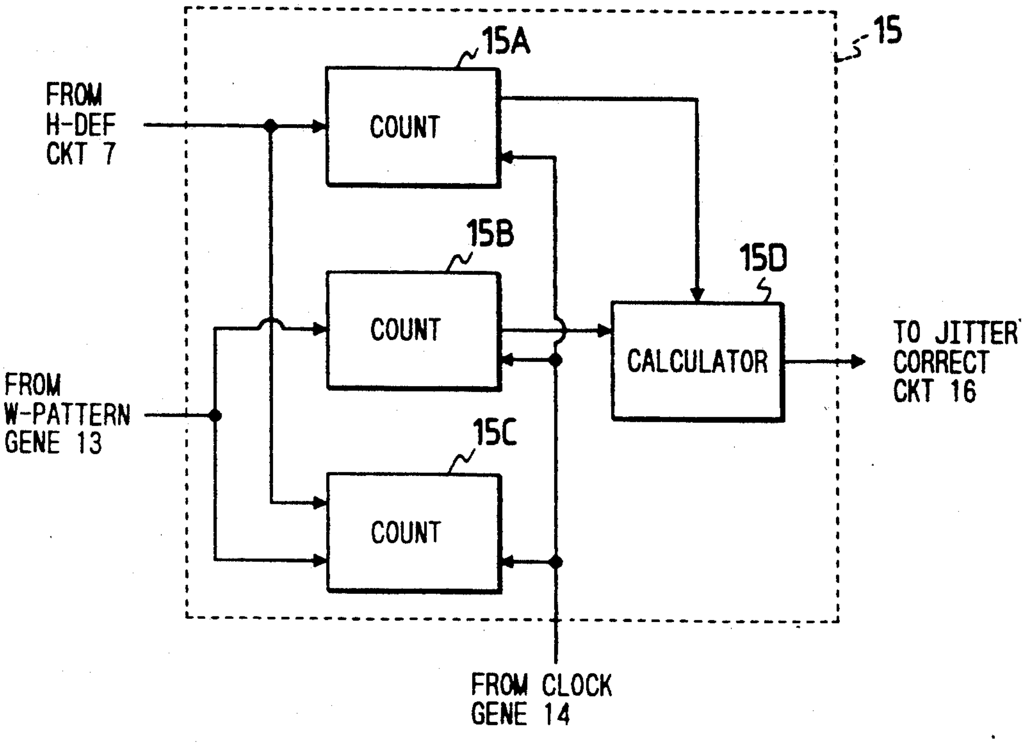
FIGS. 4 and 5 are block diagrams of the phase difference detectors of FIG. 2.

As described previously, the horizontal sync signal outputted from the video board 11 is fed to the horizontal deflection circuit 7 via the phase shifter 6. The flyback pulse signal is transmitted from the horizontal deflection circuit 7 to the phase difference detector 15. The flyback pulse signal has a waveform such as shown in the part (g) of FIG. 3. The phase difference detector 15 receives the white pattern signal (see the part (f) of FIG. 3) from the video board 11. The phase difference detector 15 also receives the clock signal from the clock signal generator 14. The clock signal has a waveform such as shown in the part (a) of FIG. 3. The phase difference detector 15 includes a counter arrangement which counts pulses of the clock signal during an interval corresponding to the difference between the phases of the flyback pulse signal and the white pattern signal. Specifically, the phase difference detector 15 detects the number of pulses of the clock signal which occur during the interval "E" between specified points F1 and G1 related to the white pattern signal and the flyback pulse signal. As shown in the part (f) of FIG. 3, the specified point F1 agrees with the center of the interval "B" during which the white information of the white pattern signal lasts. As shown in the part (g) of FIG. 3, the specified point G1 agrees with the center of the interval "A" between two successive pulses of the flyback pulse signal. In more detail, as shown in FIG. 4, the phase difference detector 15 has a first counting element 15A which counts pulses of the clock signal during the interval "A". The phase difference detector 15 also has a second counting element 15B which counts pulses of the clock signal during the interval "B". The phase difference detector 15 further has a third counting element 15C which counts pulses of the clock signal during an interval "C". As shown in FIG. 3, the interval "C" starts at the moment of the occurrence of the trailing edge of a pulse of the flyback pulse signal, and ends at the moment of the occurrence of the start of the interval "B". As shown in FIG. 4, the phase difference detector 15 has a calculator 15D which calculates a value "E" represented by the following equation.

$$E = A/2 - (C + B/2)$$

where the letters "A", "B", and "C" denote the counted pulse numbers outputted from the first, second, and third counting elements 15A, 15B, and 15C respectively. The value "E" given by the above-mentioned equation is equal to the number of pulses of the clock signal which occur during the interval "E" in FIG. 3. The count signal representing the counted pulse number "E" is fed from the phase difference detector 15 to the D/A converter 17 via the jitter correcting circuit 16. The jitter correcting circuit 16 removes jitter components from the count signal. The jitter-free count signal outputted from the jitter correcting circuit 16 is converted by the D/A converter 17 into a corresponding control voltage. In this way, the D/A converter 17 generates the control voltage which depends on the phase difference between the flyback pulse signal and the white pattern signal. As described previously, the control voltage is fed from the D/A converter 17 to the phase shifter 6. Thus, the horizontal position of the indicated image is controlled in response to the phase difference between the flyback pulse signal and the white pattern signal. The control of the horizontal position of the indicated image is preferably designed so that the indicated image can be held horizontally centered at the screen of the CRT 4 in dependent of the relation between the phases of the luminance signal and the horizontal sync signal.

Figure 5:
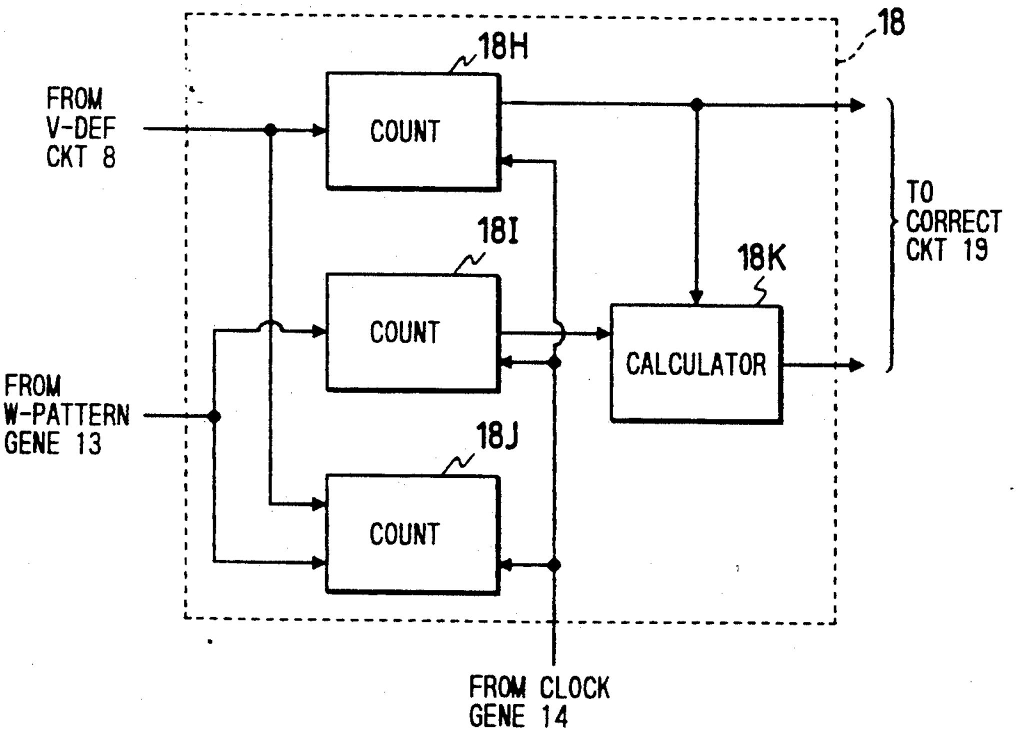

As described previously, the vertical deflection circuit 8 within the display section 10 receives the vertical sync signal from the video board 11. The vertical deflection circuit 8 generates the sawtooth current in response to the vertical sync signal. The sawtooth current is transmitted from the vertical deflection circuit 8 to the yoke 5 via the vertical centering circuit 9. The feed of the sawtooth current from the vertical deflection circuit 8 to the deflection yoke 5 causes the vertical output pulse signal, which is transmitted to the phase difference detector 18. The vertical output pulse signal has a waveform such as shown in the part (h) of FIG. 3. The phase difference detector 18 receives the white pattern signal (see the part (f) of FIG. 3) from the video board 11. The phase difference detector 18 also receives the clock signal (see the part (a) of FIG. 3) from the clock signal generator 14. The phase difference detector 18 includes a counter arrangement which counts pulses of the clock signal during an interval corresponding to the difference between the phases of the vertical output pulse signal and the white pattern signal. Specifically, the phase difference detector 18 detects the number of pulses of the clock signal which occur during the interval "K" between specified points F2 and G2 related to the white pattern signal and the vertical output pulse signal. As shown in the part (f) of FIG. 3, the specified point F2 agrees with the center of the interval "I" during which the 1-frame amount of the white information of the white pattern signal is present. As shown in the part (h) of FIG. 3, the specified point G2 agrees with the center of the interval "H" between two successive pulses of the vertical output pulse signal. In more detail, as shown in FIG. 5, the phase difference detector 18 has a first counting element 18H which counts pulses of the clock signal during the interval "H". The phase difference detector 18 also has a second counting element 18I which counts pulses of the clock signal during the interval "I". The phase difference detector 18 further has a third counting element 18J which counts pulses of the clock signal during an interval "J". As shown in FIG. 3, the interval "J" starts at the moment of the occurrence of the trailing edge of a pulse of the vertical output pulse signal, and ends at the moment of the occurrence of the start of the interval "I". As shown in FIG. 5, the phase difference detector 18 has a calculator 18K which calculates a value "K" represented by the following equation.

$$K = H/2 - (J + I/2)$$

where the letters "H", "I", and "J" denote the counted pulse numbers outputted from the first, second, and third counting elements 18H, 18I, and 18J respectively. The value "K" given by the above-mentioned equation is equal to the number of pulses of the clock signal which occur during the interval "K" in FIG. 3. The count signal representing the counted pulse number "K" is fed from the phase difference detector 18 to the count signal correcting circuit 19. In addition, the counted pulse number "H" depending on the vertical scanning frequency is fed from the phase difference detector 18 to the count signal correcting circuit 19. The count signal correcting circuit 19 corrects the received count signal into a second count signal in response to the vertical scanning frequency. Specifically, the count signal correcting circuit 19 includes a calculator which calculates a corrected pulse count number or a second count signal value "L" by referring to the following equation.

$$L=(mK)/H$$

where the letter "K" denotes the previously-mentioned counted pulse numbers, and the letter "m" denotes a predetermined constant chosen in dependence on the characteristics of circuit parts of the display apparatus. The second count signal representing the corrected pulse count number "L" is fed from the count signal correcting circuit 19 to the D/A converter 21 via the jitter correcting circuit 20. The jitter correcting circuit 20 removes jitter components from the second count signal. The jitter-free count signal outputted from the jitter correcting circuit 20 is converted by the D/A converter 21 into a corresponding control voltage. In this way, the D/A converter 21 generates the control voltage which depends on the phase difference between the vertical output pulse signal and the white pattern signal, and which also depends on the vertical scanning frequency. As described previously, the control voltage is fed from the D/A converter 21 to the vertical centering circuit 9. Thus, the vertical position of the indicated image is controlled in response to the phase difference between the vertical output pulse signal and the white pattern signal, and also in response to the vertical scanning frequency. The control of the vertical position of the indicated image is preferably designed so that the indicated image can be held vertically centered at the screen of the CRT 4 in dependent of the relation between the phases of the luminance signal and the vertical sync signal, and also in dependent of the vertical scanning frequency.

The count signal correcting circuit 19 is provided in the vertical position adjustment section of the display apparatus, while such a count signal correcting circuit is omitted from the horizontal position adjustment section of the display apparatus. This design results for the following reason. The level of the dc current superimposed on the sawtooth current to correct the position of the indicated image is independent of the vertical scanning frequency. On the other hand, the difference between the phases of the vertical output pulse signal and the white pattern signal decreases and thus the counted pulse number corresponding to the phase difference also decreases as the vertical scanning frequency rises.

This embodiment may be modified in various ways. For example, in a first modification of this embodiment, a dc current is superimposed on the output sawtooth current from the horizontal deflection circuit 7 to realize the adjustment of the horizontal position of the reproduced image. In a second modification of this embodiment, the phase of the vertical sync signal is shifted to realize the adjustment of the vertical position of the reproduced image.

DESCRIPTION OF THE SECOND PREFERRED EMBODIMENT

Figure 6:
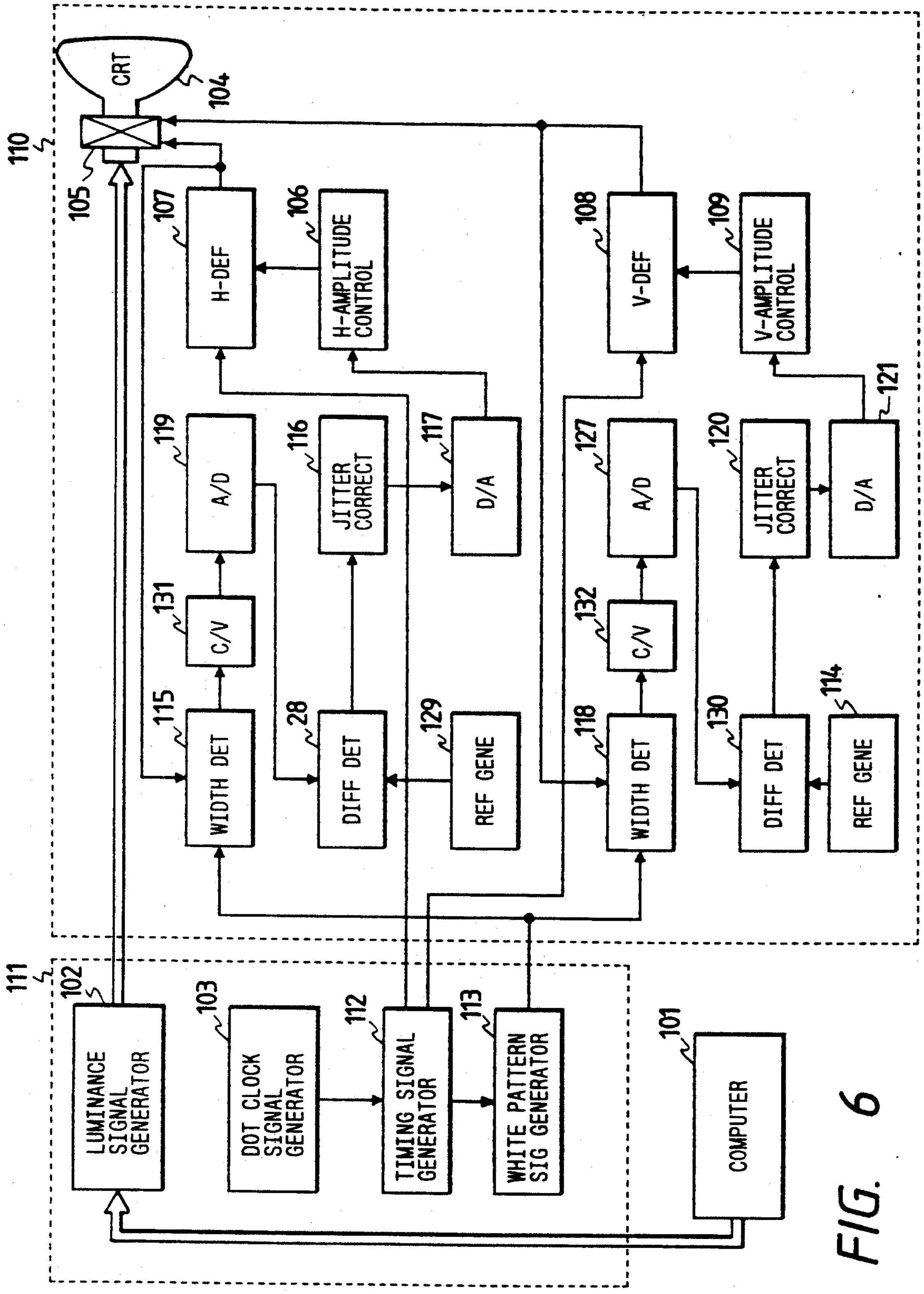
FIG. 6 is a block diagram of a display apparatus according to a second embodiment of this invention.

With reference to FIG. 6, a display apparatus of a second embodiment of this invention includes a display section (a main body) 110 and a video board 111. The display section 110 is connected to a computer 101 via the video board 111.

The video board 111 includes a luminance signal generator 102, a dot clock signal generator 103, a timing signal generator 112, and a white pattern signal generator 113. The luminance signal generator 102 receives display information (image information) from the computer 101, and generates a luminance signal corresponding to the received display information. The luminance signal generator 102 outputs the luminance signal to the display section 110. The dot clock signal generator 103 outputs a dot clock signal to the timing signal generator 112. The timing signal generator 112 has first and second portions. The first portion of the timing signal generator 112 functions to generate a vertical sync signal and a horizontal sync signal in response to the dot clock signal. The first portion of the timing signal generator 112 outputs the vertical sync signal and the horizontal sync signal to the display section 110. The second portion of the timing signal generator 112 functions to generate a front porch signal and a back porch signal in response to the dot clock signal. The second portion of the timing signal generator 112 outputs the front porch signal and the back porch signal to the white pattern signal generator 113. The white pattern signal generator 113 functions to generate a white pattern signal in response to the front porch signal and the back porch signal. The white pattern signal agrees with a luminance signal in which luminance information is continuously equal to white information. The white pattern signal generator 113 outputs the white pattern signal to the display section 110.

The display section 110 includes a cathode ray tube (CRT) 104, and a deflection yoke 105 associated with the CRT 104. The CRT 104 receives the luminance signal from the video board 111. The CRT 104 has a screen. The CRT 104 serves to indicate an image on the screen in response to the luminance signal.

The display section 110 also includes a horizontal amplitude control circuit 106 and a horizontal deflection circuit 107. The horizontal deflection circuit 107 receives the horizontal sync signal from the video board 111. The horizontal deflection circuit 107 generates a sawtooth current in response to the horizontal sync signal, and feeds the sawtooth current to the deflection yoke 105. The width of a variation in the sawtooth current, that is, the amplitude of the sawtooth current, is controlled in response to a horizontal amplitude control signal outputted from the horizontal amplitude control circuit 106. Since the horizontal dimension (the horizontal length) of a reproduced image on the screen of the CRT 104 is determined by the amplitude of the sawtooth current, the horizontal dimension of the reproduced image is controlled in response to the output signal from the horizontal amplitude control circuit 106.

The display section further includes a deflection current variation width detector 115, a current-to-voltage (C/V) converter 131, an analog-to-digital (A/D) converter 119, a width difference detector 128, a reference signal generator 129, a jitter correcting circuit 116, and a digital-to-analog (D/A) converter 117. The deflection current variation width detector 115 receives the white pattern signal from the video board 111. In addition, the deflection current variation width detector 115 receives the sawtooth current generated by the horizontal deflection circuit 107. The deflection current variation width detector 115 serves to detect the width of a variation in the sawtooth current which occurs during the duration of a pulse of the white pattern signal which represents the white luminance information. The output current signal from the deflection current variation width detector 115 which represents the detected variation width of the sawtooth current is converted into a corresponding digital signal by a combination of the C/V converter 131 and the A/D converter 119. The detected variation width signal is fed from the A/D converter 119 to the width difference detector 128. The reference signal generator 129 outputs a digital signal representing a reference variation width of the sawtooth current. The reference variation width signal is fed from the reference signal generator 129 to the width difference detector 128. The width difference detector 128 calculates a difference between the detected variation width signal and the reference variation width signal which corresponds to a difference between the detected variation width and the reference variation width. The output signal from the width difference detector 128 which represents the calculated variation width difference is fed to the D/A converter 117 via the jitter correcting circuit 116. The jitter correcting circuit 116 removes jitter components from the variation width difference signal. The jitter-free variation width difference signal outputted from the jitter correcting circuit 116 is converted by the D/A converter 117 into a corresponding voltage signal. The D/A converter 117 outputs the voltage signal to the horizontal amplitude control circuit 106. The horizontal amplitude control circuit 106 generates the horizontal amplitude control signal in response to the output voltage signal from the D/A converter 117. In this way, the amplitude of the sawtooth current, that is, the horizontal dimension of the reproduced image, is feedback-controlled in response to the difference between the detected amplitude and the reference amplitude of the sawtooth current. This control of the amplitude of the sawtooth current is designed so that the horizontal dimension of the reproduced image will be maintained at a desired dimension determined by the reference amplitude of the sawtooth current.

The display section 110 also includes a vertical deflection circuit 108 and a vertical amplitude control circuit 109. The vertical deflection circuit 108 receives the vertical sync signal from the video board 111. The vertical deflection circuit 108 generates a sawtooth current in response to the vertical sync signal, and feeds the sawtooth current to the deflection yoke 105. The width of a variation in the sawtooth current, that is, the amplitude of the sawtooth current, is controlled in response to a vertical amplitude control signal outputted from the vertical amplitude control circuit 109. Since the vertical dimension (the vertical length) of a reproduced image on the screen of the CRT 104 is determined by the amplitude of the sawtooth current, the vertical dimension of the reproduced image is controlled in response to the output signal from the vertical amplitude control circuit 109.

The display section further includes a deflection current variation width detector 118, a current-to-voltage (C/V) converter 132, an analog-to-digital (A/D) converter 127, a width difference detector 130, a reference signal generator 114, a jitter correcting circuit 120, and a digital-to-analog (D/A) converter 121. The deflection current variation width detector 118 receives the white pattern signal from the video board 111. In addition, the deflection current variation width detector 118 receives the sawtooth current generated by the vertical deflection circuit 108. The deflection current variation width detector 118 serves to detect the width of a variation in the sawtooth current which occurs during a predetermined interval corresponding to one frame or one field. The output current signal from the deflection current variation width detector 118 which represents the detected variation width of the sawtooth current is converted into a corresponding digital signal by a combination of the C/V converter 132 and the A/D converter 127. The detected variation width signal is fed from the A/D converter 127 to the width difference detector 130. The reference signal generator 114 outputs a digital signal representing a reference variation width of the sawtooth current. The reference variation width signal is fed from the reference signal generator 114 to the width difference detector 130. The width difference detector 130 calculates a difference between the detected variation width signal and the reference variation width signal which corresponds to a difference between the detected variation width and the reference variation width. The output signal from the width difference detector 130 which represents the calculated variation width difference is fed to the D/A converter 121 via the jitter correcting circuit 120. The jitter correcting circuit 120 removes jitter components from the variation width difference signal. The jitter-free variation width difference signal outputted from the jitter correcting circuit 120 is converted by the D/A converter 121 into a corresponding voltage signal. The D/A converter 121 outputs the voltage signal to the vertical amplitude control circuit 109. The vertical amplitude control circuit 109 generates the vertical amplitude control signal in response to the output voltage signal from the D/A converter 121. In this way, the amplitude of the sawtooth current, that is, the vertical dimension of the reproduced image, is feedback-controlled in response to the difference between the detected amplitude and the reference amplitude of the sawtooth current. This control of the amplitude of the sawtooth current is designed so that the vertical dimension of the reproduced image will be maintained at a desired dimension determined by the reference amplitude of the sawtooth current.

This embodiment will be further explained. As described previously, the timing signal generator 112 within the video board 111 generates-the horizontal sync signal, the vertical sync signal, the front porch signal, and the back porch signal in response to the dot clock signal fed from the dot clock signal generator 103. The horizontal sync signal, the vertical sync signal, the back porch signal, and the front porch signal have waveforms such as shown in the parts (b), (c), (d), and (e) of FIG. 7. The white pattern signal generator 113 generates the white pattern signal in response to the front porch signal and the back porch signal. As shown in the part (f) of FIG. 7, the white pattern signal agrees with a luminance signal in which luminance information present for an interval determined by the front and back porch signals is made equal to white information. The white pattern signal generator 113 outputs the white pattern signal to the display section 110.

Figure 7:
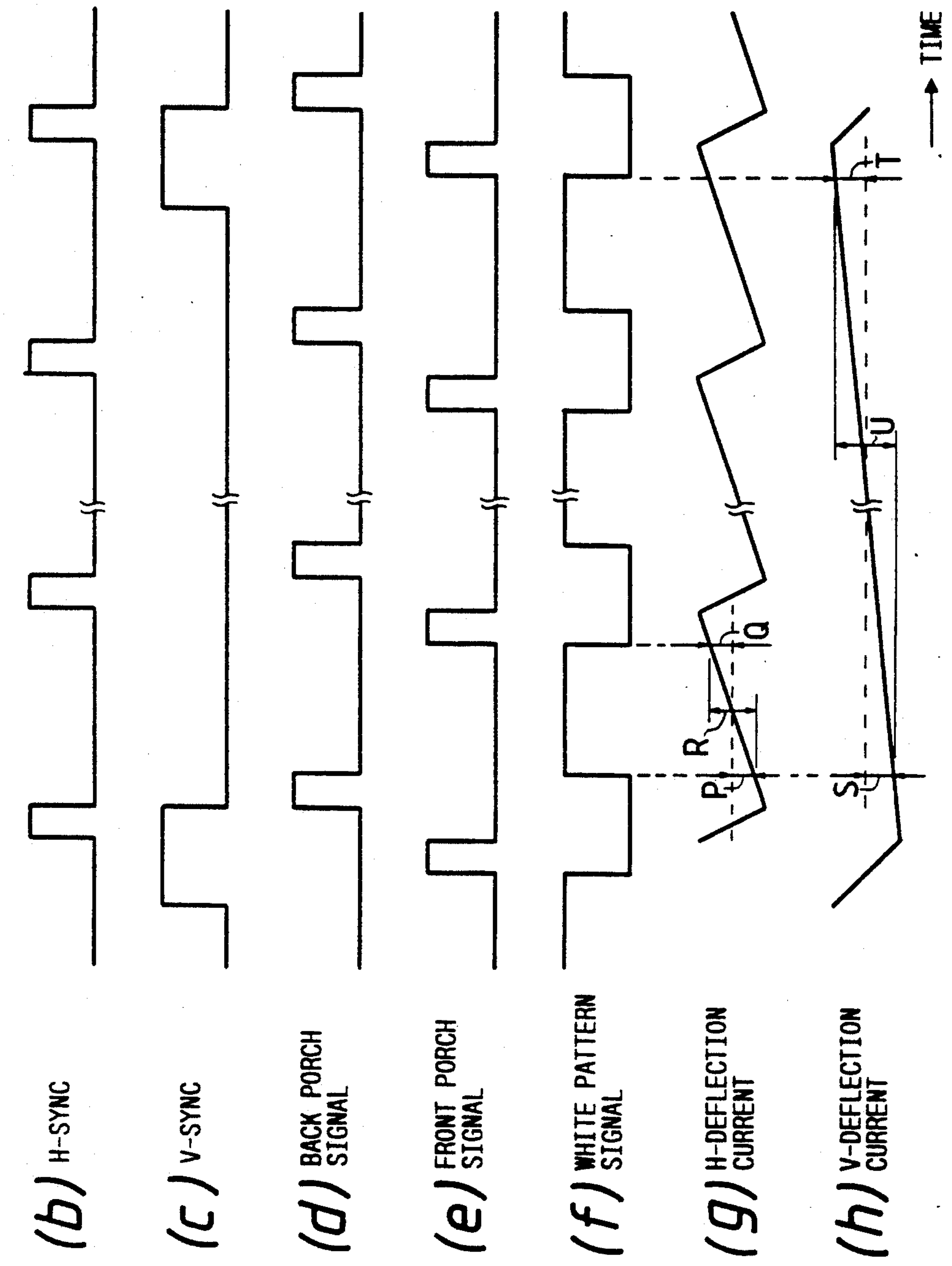
FIGS. 7(*b*)-(*h*) is a time-domain diagram showing the waveforms of various signals in the display apparatus of FIG. 6.

As described previously, the deflection current variation width detector 115 receives the white pattern signal from the video board 111. In addition, the deflection current variation width detector 115 receives the sawtooth current generated by the horizontal deflection circuit 107. The sawtooth current generated by the horizontal deflection circuit 107 has a waveform such as shown in the part (g) of FIG. 7. As shown in FIG. 7, the deflection current variation width detector 115 detects the level "P" of the sawtooth current at the moment of the occurrence of the leading edge of a pulse of the white pattern signal which represents the white luminance information. In addition, the deflection current variation width detector 115 detects the level "Q" of the sawtooth current at the moment of the occurrence of the trailing edge of the pulse of the white pattern signal which represents the white luminance information. Further, the deflection current variation width detector 115 derives the variation width "R" of the sawtooth current which is expressed by the following equation.

$$R=P+Q$$

where the letters "P" and "Q" denote the detected levels of the sawtooth current. The output current signal from the deflection current variation width detector 115 which represents the detected variation width "R" of the sawtooth current is converted into the corresponding digital signal by the combination of the C/V converter 131 and the A/D converter 119. The detected variation width signal is fed from the A/D converter 119 to the width difference detector 128. As described previously, the reference variation width signal is fed from the reference signal generator 129 to the width difference detector 128. The width difference detector 128 outputs the signal representing the difference between the detected variation width and the reference variation width. The output signal from the width difference detector 128 is fed to the D/A converter 117 via the jitter correcting circuit 116, being converted by the D/A converter 117 into the corresponding voltage signal. The D/A converter 117 outputs the voltage signal to the horizontal amplitude control circuit 106. The horizontal amplitude control circuit 106 generates the horizontal amplitude control signal in response to the output voltage signal from the D/A converter 117. In this way, the amplitude of the sawtooth current, that is, the horizontal dimension of the reproduced image, is feedback-controlled in response to the difference between the detected amplitude and the reference amplitude of the sawtooth current.

As described previously, the deflection current variation width detector 118 receives the white pattern signal from the video board 111. In addition, the deflection current variation width detector 118 receives the sawtooth current generated by the vertical deflection circuit 108. The sawtooth current generated by the vertical deflection circuit 108 has a waveform such as shown in the part (h) of FIG. 7. As shown in FIG. 7, the deflection current variation width detector 118 detects the level "S" of the sawtooth current at the moment of the occurrence of the leading edge of a pulse of the white pattern signal which represents the white luminance information. In addition, the deflection current variation width detector 118 detects the level "T" of the sawtooth current at the moment of the occurrence of the trailing edge of a pulse of the white pattern signal which represents the white luminance information. The pulses for determining the detection timings are spaced by a predetermined interval corresponding to one field or one frame. Further, the deflection current variation width detector 118 derives the variation width "U" of the sawtooth current which is expressed by the following equation.

$$U=S+T$$

where the letters "S" and "T" denote the detected levels of the sawtooth current. The output current signal from the deflection current variation width detector 118 which represents the detected variation width "U" of the sawtooth current is converted into the corresponding digital signal by the combination of the C/V converter 132 and the A/D converter 127. The detected variation width signal is fed from the A/D converter 127 to the width difference detector 130. As described previously, the reference variation width signal is fed from the reference signal generator 114 to the width difference detector 130. The width difference detector 130 outputs the signal representing the difference between the detected variation width and the reference variation width. The output signal from the width difference detector 130 is fed to the D/A converter 121 via the jitter correcting circuit 120, being converted by the D/A converter 121 into the corresponding voltage signal. The D/A converter 121 outputs the voltage signal to the vertical amplitude control circuit 109. The vertical amplitude control circuit 109 generates the vertical amplitude control signal in response to the output voltage signal from the D/A converter 121. In this way, the amplitude of the sawtooth current, that is, the vertical dimension of the reproduced image, is feedback-controlled in response to the difference between the detected amplitude and the reference amplitude of the sawtooth current.

What is claimed is:

1. A display apparatus comprising:
   - a cathode ray tube;
   - a deflection yoke attached to the cathode ray tube;
   - a deflection means for generating a sawtooth current in response to an input sync signal, and feeding the sawtooth current to the deflection yoke;
   - a phase difference detecting means for detecting a difference between a phase of the sawtooth current generated by the deflection means and a phase of a color pattern signal which represents a start and an end of luminance information in an input luminance signal; and
   - correcting means for correcting an image-indicated position in response to the phase difference detected by the phase difference detecting means.

2. A display apparatus comprising:
   - a cathode ray tube;
   - a deflection yoke attached to the cathode ray tube;
   - a deflection means for generating a sawtooth current in response to an input sync signal, and feeding the sawtooth current to the deflection yoke;
   - a phase difference detecting means for detecting a difference between a phase of the sawtooth current generated by the deflection means and a phase of a color pattern signal which represents a start and an end of luminance information in an input luminance signal; and
   - phase shifting means for shifting a phase of the input sync signal in response to the phase difference detected by the phase difference detecting means.

3. A display apparatus comprising:

a cathode ray tube;

a deflection yoke attached to the cathode ray tube;

a deflection means for generating a sawtooth current in response to an input sync signal, and feeding the sawtooth current to the deflection yoke;

a phase difference detecting means for detecting a difference between a phase of the sawtooth current generated by the deflection means and a phase of a color pattern signal which represents a start and an end of luminance information in an input luminance signal; and current superimposing means for generating a direct current in response to the phase difference detected by the phase difference detecting means, and superimposing the generated direct current on the sawtooth current generated by the deflection means.

4. A display apparatus comprising:

a cathode ray tube;

a deflection yoke attached to the cathode ray tube;

a deflection means for generating a sawtooth current in response to an input sync signal, and feeding the sawtooth current to the deflection yoke;

a phase difference detecting means for detecting a difference between a phase of the sawtooth current generated by the deflection means and a phase of a color pattern signal which represents a start and an end of luminance information in an input luminance signal;

phase shifting means for shifting a phase of the input sync signal in response to the phase difference detected by the phase difference detecting means; and current superimposing means for generating a direct current in response to the phase difference detected by the phase difference detecting means, and superimposing the generated direct current on the sawtooth current generated by the deflection means.

5. A display apparatus comprising:

a screen;

means for indicating an image on the screen in response to an input image information signal and an input sync signal;

means for generating a reference signal having a predetermined phase relation with the input image information signal;

means for detecting a difference between a phase of the input sync signal and a phase of the reference signal; and means for controlling a position of the indicated image relative to the screen in response to the detected phase difference.

6. The display apparatus of claim 5 wherein the controlling means comprises means for shifting a phase of the input sync signal in response to the detected phase difference.

7. The display apparatus of claim 5 wherein the indicating means comprises a cathode ray tube having the screen, a deflection yoke attached to the cathode ray tube, deflection means for generating a sawtooth current in response to the input sync signal and feeding the generated sawtooth current to the deflection yoke, and wherein the controlling means comprises means for modifying the sawtooth current in response to the detected phase difference.

8. A display apparatus comprising:

a cathode ray tube;

a deflection yoke attached to the cathode ray tube;

a deflection means for generating a sawtooth current in response to an input sync signal, and feeding the sawtooth current to the deflection yoke;

means for generating a color pattern signal representing a start and an end of luminance information in an input luminance signal;

a variation width detecting means for detecting a width of a variation in the sawtooth current during an interval responsive to the color pattern signal; and means for controlling an amplitude of the sawtooth current in response to the detected variation width of the sawtooth current.

9. A display apparatus comprising:

a screen;

means for indicating an image on the screen in response to an input image information signal;

means for detecting a dimension of the image indicated on the screen;

means for generating a predetermined desired dimension of the image indicated on the screen;

means for deriving a difference between the detected dimension and the desired dimension of the image; and means for controlling the dimension of the image in response to the derived difference.

* * * * *